United States Patent [19]
Razban

[11] Patent Number: 5,289,587
[45] Date of Patent: Feb. 22, 1994

[54] APPARATUS FOR AND METHOD OF PROVIDING THE PROGRAM COUNTER OF A MICROPROCESSOR EXTERNAL TO THE DEVICE

[75] Inventor: Bruce B. Razban, Mountain View, Calif.

[73] Assignee: National Semiconductor Corporation, Santa Clara, Calif.

[21] Appl. No.: 973,208

[22] Filed: Nov. 6, 1992

Related U.S. Application Data

[63] Continuation of Ser. No. 680,050, Mar. 29, 1991, Pat. No.

[51] Int. Cl.⁵ .............................................. G06F 11/32
[52] U.S. Cl. ................................. 395/375; 395/575; 364/DIG. 1; 364/267.91; 364/247.8; 364/285
[58] Field of Search ................... 371/19; 395/575, 775, 395/375

[56] References Cited

U.S. PATENT DOCUMENTS

| | | | |
|---|---|---|---|
| 4,267,581 | 5/1981 | Kobayashi et al. | 395/775 |
| 4,308,581 | 12/1981 | Raghunathan | 395/575 |
| 4,460,972 | 7/1984 | Homan et al. | 395/375 |
| 4,670,838 | 6/1987 | Kawata | 395/375 |
| 4,823,307 | 4/1989 | Melgara et al. | 371/19 |
| 4,841,434 | 6/1989 | Mathewes, Jr. et al. | 371/19 |
| 4,872,167 | 10/1989 | Maezawa et al. | 371/19 |
| 4,881,228 | 11/1989 | Shouda | 371/19 |
| 5,021,948 | 6/1991 | Nakayama et al. | 395/500 |

Primary Examiner—Debra A. Chun
Attorney, Agent, or Firm—Limbach & Limbach

[57] ABSTRACT

A microprocessor's program counter is made available external to the device on a dedicated bus. Thus, an emulator can readily generate a list of executed instruction addresses by monitoring the bus. This eliminates the conventional requirement of monitoring system bus traffic and attempting to extract and reconstruct the instruction execution sequence.

11 Claims, 2 Drawing Sheets

APPARATUS FOR AND METHOD OF PROVIDING THE PROGRAM COUNTER OF A MICROPROCESSOR EXTERNAL TO THE DEVICE

This is a continuation of co-pending application Ser. No. 07/680,050, filed on Mar. 29, 1991, which in turn is a file-wrapper-continuation of application Ser. No. 07/278,003, filed Nov. 30, 1988, now abandoned, by BRUCE B. RAZBAN for APPARATUS FOR AND METHOD OF PROVIDING THE PROGRAM COUNTER OF A MICROPROCESSOR EXTERNAL TO THE DEVICE.

BACKGROUND OF THE INVENTION

1. Field of the Invention

The present invention relates to in-circuit emulation and, in particular, to a technique for providing a microprocessor's program counter value external to the device on a dedicated bus so that an emulator can readily generate a list of executed instruction addresses by monitoring this bus.

2. Discussion of the Prior Art

A microprocessor is useful only if it is possible for systems designers incorporating the microprocessor to "debug" their systems. One particular challenge of developing a microprocessor system design is to identify "bugs" that arise only rarely or only at full frequency operation.

Microprocessor system designers rely on so-called in-circuit emulation techniques to monitor a working system and trace information relating to the ongoing operation of the system to diagnose bugs. One of the most important elements of information to be traced is the value contained in the microprocessor's program counter register.

A microprocessor's program counter register contains the address of the instruction that is presently being executed by the microprocessor. Therefore, by tracing the address value contained in the program counter register, the sequence of instruction execution in the program operating the system can be monitored.

The conventional approach to tracing program execution has been a three step process. First, traffic on the system bus is monitored to trace instruction and data transfers between the system's processing unit and remote main memory. Second, instruction read references are extracted from the bus traffic. Third, the probable sequence of instruction execution is reconstructed based on the extracted instruction read references.

There are several underlying assumptions associated with this conventional approach. One assumption is that the latency between reading an instruction from the system bus and executing the instruction is not significant. This assumption is necessary because there is normally no method of determining when a particular instruction begins execution. A second assumption is that all instruction and data transfers to the processing unit are observable on the system bus. This assumption permits the extraction of instruction read references from the bus and the reconstruction of instruction execution utilizing a software disassembler.

Problems with the conventional approach to in-circuit emulation occur when instruction read references are not observable on the system bus. This can occur either because the microprocessor has a large instruction prefetch queue which, based on the occurrence of exceptions or other anomalies, may not represent the true sequence of instruction execution, or because it includes a local instruction cache so that instruction read references may be serviced by the cache and not appear on the system bus. An instruction cache can normally be disabled at the cost of running the microprocessor at reduced performance. A prefetch queue, however, is an integral part of the processor and cannot be disabled or bypassed.

The prior art technique for solving this problem is to design an external discrete implementation of portions of the particular microprocessor to be emulated. This permits instruction address reconstruction from system bus traffic and from key signals provided by discrete hardware in the emulator.

An additional emulation problem has been correlating the trace listing of executed instructions with a program listing, since the program listing consists of virtual addresses, while the trace listing consists of physical addresses. The difference is due to address translation at run time performed by a memory management unit. The processing unit's integrated memory management unit translates the virtual addresses generated by the executing program to the physical addresses used to access main memory via the system bus. In some circumstances, this translation will not be 1:1; that is, more than one virtual address can be translated to a single physical address. In such cases, it is impossible to determine the virtual addresses of memory references for an executing program by merely observing the physical addresses of the instruction read references on the system bus. Thus, the task of translating addresses from physical back to virtual is not normally possible because of insufficient information available to the emulator. When this translation is important, an external MMU-like device must be built with discrete or custom hardware to provide this functionality in the emulator.

SUMMARY OF THE INVENTION

The present invention addresses all of the above-described current problems associated with in-circuit emulation by providing a microprocessor's program counter value external to the device on a dedicated bus. An emulator can then readily generate a list of executed instruction addresses by simply monitoring this bus. This eliminates the conventional requirement of monitoring system bus traffic and attempting to extract and reconstruct the sequence of instruction execution. Since the externally-provided program counter value is synchronized with the internal program counter of the microprocessor, there is no latency between the observed program counter value and the actual program counter value. Furthermore, the addresses of all executed instructions are observable on the external pins. Therefore, it is not necessary to degrade processor performance by disabling an instruction cache, nor is it necessary to build address translation hardware for converting physical addresses back to virtual addresses.

Other features and advantages of the present invention will be understood and appreciated by reference to the following detailed description of an embodiment of the invention, which should be considered in conjunction with the accompanying drawings.

DETAILED DESCRIPTION OF THE INVENTION

Figure 1:
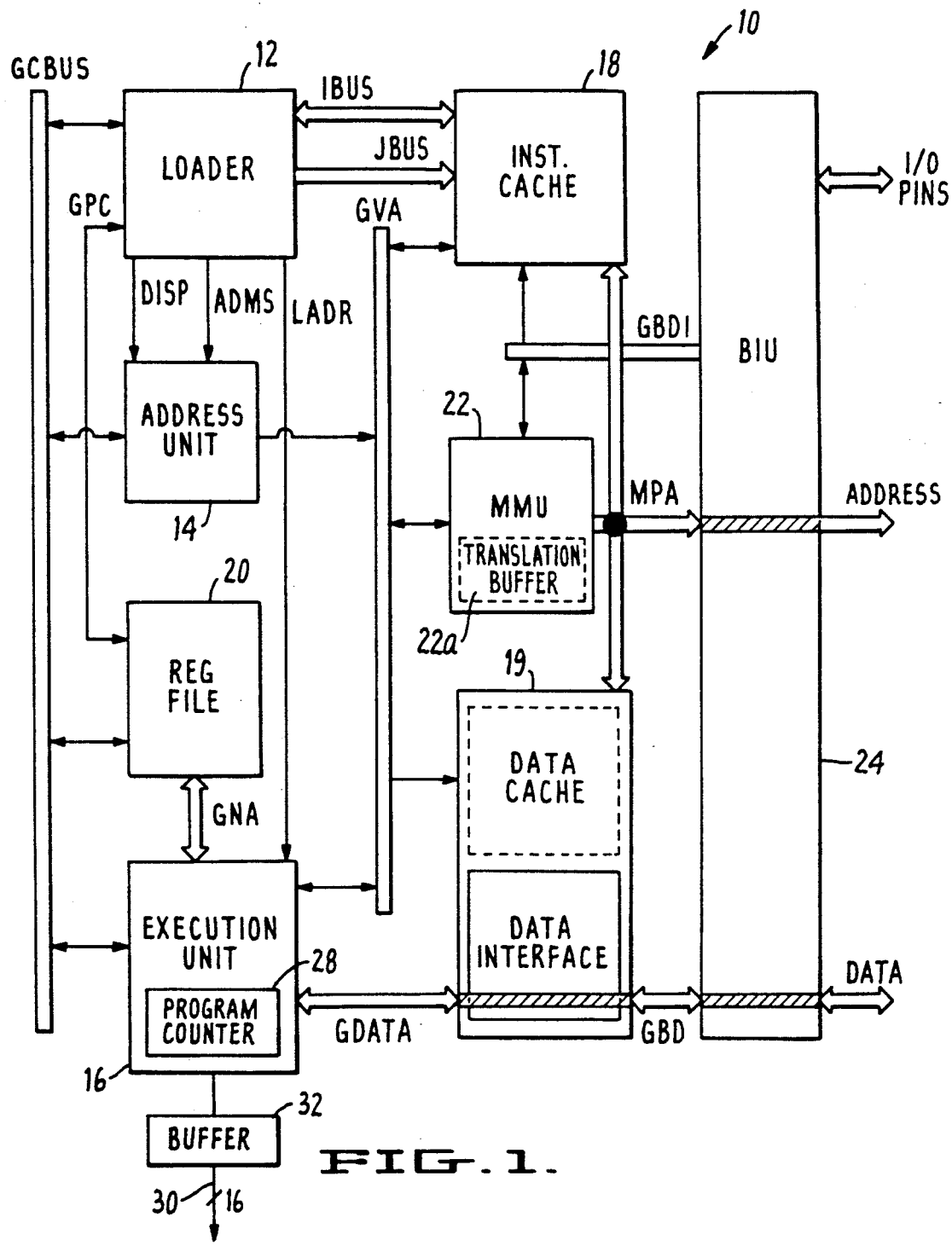
FIG. 1 is a block diagram illustrating the architecture of a 32-bit virtual memory microprocessor with pipelined instruction execution and integrated cache memory.

FIG. 1 shows a microprocessor 10 that is organized internally as eight major functional units.

A loader 12 prefetches instructions and decodes them for use by an address unit 14 and an execution unit 16. Loader 12 receives code characters from an instruction cache 18 in the form of 32-bit doublewords and aligns the code characters as the corresponding instructions. Loader 12 transfers instructions received from instruction cache 18 into an 8-byte instruction queue. Loader 12 can extract an instruction field on each cycle, where a "field" means either an op code, displacement or immediate value. Loader 12 decodes the op code to generate the initial microcode address, which is passed on to execution unit 16. The decoded general addressing codes are passed on the ADMS bus to address unit 14. Displacement values are passed to address unit 14 on the DISP bus.

Address unit 14 calculates effective addresses using a dedicated 32-bit adder and reads source operands for execution unit 16. Address unit 14 controls a port from a register file 20 to the GCBUS through which it transfers base and index values to the address adder and data values to execution unit 16. Effective addresses for operand references are transferred to memory management unit 22 and data cache 26 on the GVA bus, which is the virtual address bus.

Execution unit 16 includes the data path and the microcoded control for executing instructions and processing exceptions.

Execution unit 16 controls a port to register file 20 from the GNA bus on which it stores results. The GNA bus is also used by execution unit 16 to read the values of dedicated registers. A two-entry data buffer allows execution unit 16 to overlap the execution of one instruction with storing results to memory for previous instructions. The GVA bus is used by execution unit 16 to perform memory references for complex instructions and exception processing.

Figure 2:
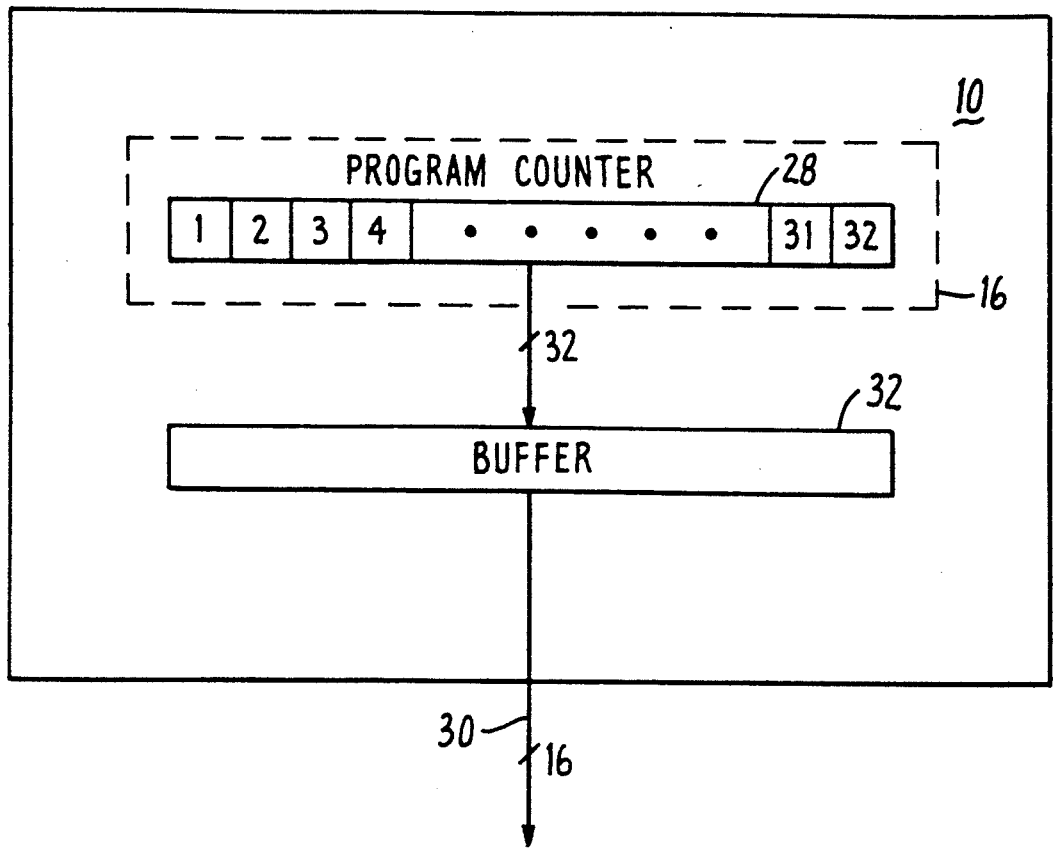
FIG. 2 is a block diagram schematically illustrating the availability of a microprocessor's program counter value on an external bus in accordance with the present invention.

As shown in FIGS. 1 and 2, a 32-bit program counter register 28, which holds the virtual address of the currently executing instruction, is among the dedicated registers of microprocessor 10.

The instruction cache 18, address unit 14 and execution unit 16 make requests to memory management unit 22 via the GVA bus for references to external main memory. Memory management unit 22 arbitrates the requests, granting access to transfer a virtual address on the GVA bus. Memory management unit 22 translates the virtual address it receives on the GVA bus to the corresponding physical address using its local translation buffer 22a.

Instruction cache 18 includes an instruction buffer from which it can transfer 32 bits of code per cycle on the IBUS to loader 12. If the instruction read reference results in an instruction cache hit, then the instruction buffer is loaded from the selected set of instruction cache 18. In the event of a miss, instruction cache 18 transfers the address of the missing instruction on the GVA bus to memory management unit 22 which translates the virtual address to its corresponding physical address for an external reference by bus interface unit 24. Bus interface unit 24 then initiates a read cycle to load the instruction buffer from external memory via the GBDI bus. The reference instruction is then written to one of the sets of instruction cache 18.

When a data read reference is issued, memory management unit 22 translates the virtual address to the corresponding physical address and transfers it to data cache 26 and bus interface unit 24 on the MPA bus. Data cache 14 performs address comparison while bus interface unit 24 simultaneously initiates a bus cycle to read data from external memory. If the cache reference is a hit, then the selected data is transferred from data cache 26 to execution unit 16 on the GDATA bus and bus interface unit 24 cancels the external bus cycle. If the reference is a miss, the bus interface unit 24 completes the external bus cycle and transfers data from external memory to execution unit 16 and data cache 26 which updates the cache entry.

If the information necessary to translate a virtual address to a corresponding physical address is missing from the translation buffer 22a, then microprocessor 10 automatically locates the information in external memory and updates the translation buffer 22a.

The program counter register 28 of microprocessor 10 contains the virtual address of the first byte of the instruction currently being executed by microprocessor 10. The address value contained in the program counter register 28 is incremented to point to the next instruction only when microprocessor 10 completes execution of the current instruction.

Figure 3:
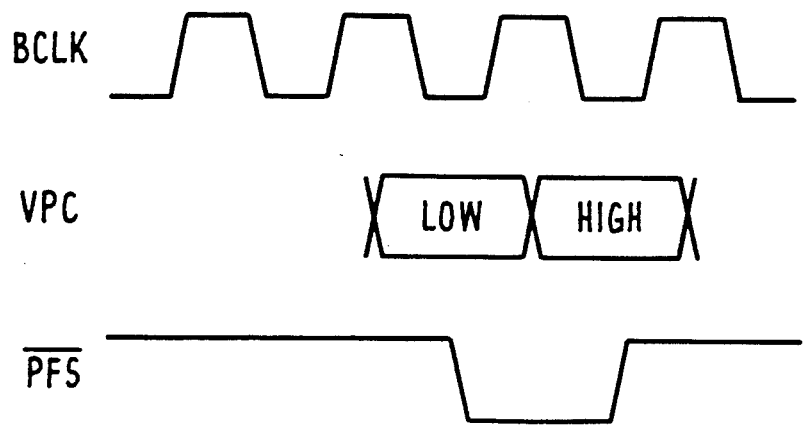
FIG. 3 is a timing diagram illustrating the transfer of a 32-bit program counter value to a 16-bit dedicated external bus in two consecutive cycles in accordance with the present invention.

Referring to FIGS. 2 and 3, in accordance with the present invention, microprocessor 10 provides the value of the virtual program counter register 28 for each executed instruction. This value is available via a dedicated 16-bit external bus 30 which, as shown in FIG. 3, provides this information on two consecutive cycles synchronized to active low program fetch status (PFS). If sufficient external pins are available, the full 32-bit value can be made available in a single cycle. The program counter value is made available on the bus 30 without effecting performance, thus ensuring that microprocessors that are intended for in-circuit emulation will be identical in behavior to other microprocessors.

Whenever a new instruction begins actual execution, microprocessor 10 activates the PFS signal. As stated above, the 32-bit virtual program counter register value of that instruction is sent out on the 16-bit bus 30 in two consecutive cycles, beginning with the lower 16 bits.

If an exception occurs during execution of an instruction, microprocessor 10 will trap via its conventional trap mechanism. The next virtual program counter value to be sent out on the bus 30 in synchronization to the next PFS signal will be that of the first instruction of the trap routine. If the suspended instruction is re-executed, then its virtual program counter value will be sent again with a PFS indication upon returning from the trap routine.

As shown in FIG. 3, the high to low transition of the PFS signal validates the low 16 bits of the program counter register value and the low to high transition of the PFS signal validates its high 16 bits.

As shown in FIG. 2, the provision of the virtual program counter value on a dedicated external bus 30 is implemented by using standard buffers 32 to provide enough drive for the register value to be sent to the bus 30. Therefore, no special buffering is required except the standard buffers 32 needed to output signals to the bus 30.

It should be understood that various alternatives to the embodiment of the invention described herein may be utilized in practicing the invention. It is intended that the following claims define the scope of the invention and that structure and method within the scope of these claims and their equivalents be covered thereby.

What is claimed is:

1. In a data processing device that executes a sequence of instructions which may include program instructions and operating system instructions, the data processing device including a program counter register that contains an address of each instruction within the sequence of instructions as it is being executed by the data processing device, the improvement comprising a dedicated external bus connectable to the program counter register for providing the address of each instruction in the sequence of instructions substantially simultaneously with its execution to a monitoring device connectable to the dedicated external bus and external to the data processing device, wherein the contents of the program counter register is transferred to the dedicated external bus under the control of the data processing device.

2. A microprocessor device that executes a sequence of instructions which may include program instructions and operating system instructions, the microprocessor device comprising:
    (a) a program counter register that contains an address of each instruction within the sequence of instructions as it is being executed by the microprocessor device; and
    (b) dedicated external bus means connectable between the program counter register and a monitoring device external to the microprocessor device for providing the address of each instruction in the sequence of instructions executed by the microprocessor device to the monitoring device substantially simultaneously with its execution, wherein the contents of the program counter register is transferred to the dedicated external bus under the control of the microprocessor.

3. A microprocessor device that includes means for executing a sequence of instructions which may include program instructions and operating system instructions, the microprocessor device comprising:
    (a) a program counter register that contains an address of each instruction within the sequence of instructions as it is being executed by the microprocessor device;
    (b) buffer means connected to the program counter register for receiving the address of the instruction currently being executed by the microprocessor, wherein the contents of the program counter register is transferred to the buffer means under the control of the microprocessor; and
    (c) a dedicated external bus connected to the buffer means for receiving the address stored in the buffer means
    whereby the address of each instruction executed by the microprocessor device is available via the external bus to a monitoring device connectable to the external bus and external to the microprocessor device such that the address of each instruction in the sequence of instructions actually executed by the microprocessor device can be externally monitored substantially simultaneously with its execution by the monitoring device via the dedicated external bus.

4. A microprocessor device as in claim 3 wherein the program counter register has a predefined bit size and the external bus has a bit size equal to the predefined bit size.

5. A microprocessor device as in claim 3 and further including execution means responsive to a system clock for executing the sequence of instructions in accordance with cycles of the system clock and wherein the buffer means connected to the program counter register transfer the contents of the program counter register to the dedicated external bus in multiple consecutive cycles of the system clock.

6. A microprocessor device as in claim 5 wherein the program counter register is a 32 bit register and the dedicated external bus is a 16 bit bus and the microprocessor device includes means for transferring the contents of the program counter register to the dedicated external bus in two consecutive cycles of the system clock.

7. A microprocessor device that executes a sequence of instructions, each instruction having a virtual address associated therewith, the microprocessor device comprising:
    (a) reference means for referencing the virtual address of an instruction;
    (b) translation means connected to the reference means for translating the virtual address to a corresponding physical address of a storage location in external memory that contains the instruction;
    (c) retrieval means responsive to the physical address for retrieving the instruction from external memory via a system bus connectable between the retrieval means and external memory;
    (d) execution means connected to the retrieval means for executing the retrieved instruction as a currently executing instruction;
    (e) storage means for storing the virtual address of the retrieved instruction;
    (f) a dedicated external bus adaptable for connecting a monitoring device external to the microprocessor device thereto; and
    (g) transfer means connectable between the storage means and the dedicated external bus for transferring the virtual address of each of the instructions in the sequence of instructions to the dedicated external bus substantially simultaneously with execution of said each instruction whereby the virtual address of each instruction executed by the microprocessor may be monitored by the monitoring device.

8. A method of monitoring a sequence of instructions executed by a data processing system, where the sequence of instructions may include program instructions and operating system instructions, the method comprising:
    (a) retrieving an instruction which is part of the sequence of instructions from a storage device via a system bus for execution by the data processing system as a currently executing instruction;
    (b) storing an address of the currently executing instruction in a storage register;
    (c) transferring the address of the currently executing instruction from the storage register to a dedicated external bus of the data processing system substantially simultaneously with execution of said currently executing instruction, the transfer being under the control of the data processing system; and (d) monitoring the dedicated external bus utilizing a monitoring device connectable to the dedicated external bus.

9. A method of monitoring a sequence of instructions executed by a microprocessor device, each instruction having a virtual address associated therewith, the method comprising:

(a) referencing the virtual address of an instruction within the sequence of instructions;

(b) translating the virtual address to a corresponding physical address of a storage location in an external memory that contains the instruction;

(c) retrieving the instruction from external memory utilizing the physical address;

(d) executing the instruction as a currently executing instruction;

(e) storing the virtual address of the currently executing instruction;

(f) transferring the virtual address of the currently executing instruction to a dedicated external bus substantially simultaneously with execution of said currently executing instruction; and (g) monitoring the dedicated external address utilizing a monitoring device connectable to the dedicated external bus.

10. A method as in claim 9 wherein the microprocessor device is responsive to a system clock for executing instructions in accordance with cycles of the system clock and wherein the virtual address of the currently executing instruction is transferred to the dedicated external bus substantially simultaneously with its execution in a single cycle of the system clock.

11. A method as in claim 9 wherein the microprocessor device is responsive to a system clock for executing instructions in accordance with cycles of the system clock and wherein the virtual address of the currently executing instruction is transferred to the dedicated external bus substantially simultaneously with its execution in multiple, consecutive cycles of the system clock.

* * * * *